US009117013B2

(12) United States Patent
Clementi et al.

(10) Patent No.: US 9,117,013 B2
(45) Date of Patent: Aug. 25, 2015

(54) COMBINING MONITORING TECHNIQUES

(75) Inventors: Ashley Neil Clementi, Karrinyup (AU); Jean-Jacques Heler, Palo Alto, CA (US); Paul Fredric Klein, Newbury Park, CA (US)

(73) Assignee: International Business Machines Corporation, Armonk, NY (US)

( * ) Notice: Subject to any disclaimer, the term of this patent is extended or adjusted under 35 U.S.C. 154(b) by 1263 days.

(21) Appl. No.: 12/576,174

(22) Filed: Oct. 8, 2009

(65) Prior Publication Data
US 2011/0088042 A1 Apr. 14, 2011

(51) Int. Cl.
G06F 9/46 (2006.01)
G06F 11/00 (2006.01)
G06F 11/34 (2006.01)

(52) U.S. Cl.
CPC ........ *G06F 11/3419* (2013.01); *G06F 11/3495* (2013.01); *G06F 2201/835* (2013.01); *G06F 2201/865* (2013.01); *G06F 2201/87* (2013.01)

(58) Field of Classification Search
CPC ............ G06F 11/3419; G06F 11/3495; G06F 2201/835; G06F 2201/865; G06F 2201/87
See application file for complete search history.

(56) References Cited

U.S. PATENT DOCUMENTS

| 5,471,614 | A | 11/1995 | Kakimoto |
| 5,914,951 | A | 6/1999 | Bentley et al. |
| 6,108,700 | A | 8/2000 | Maccabee et al. |
| 6,195,533 | B1 | 2/2001 | Tkatch et al. |
| 6,401,111 | B1 | 6/2002 | Dan et al. |
| 6,484,129 | B2 * | 11/2002 | Klein et al. .................. 702/186 |
| 6,633,908 | B1 * | 10/2003 | Leymann et al. ............. 709/224 |
| 6,748,583 | B2 | 6/2004 | Aizenbud-Reshef et al. |
| 6,817,010 | B2 | 11/2004 | Aizenbud-Reshef et al. |
| 7,203,458 | B1 | 4/2007 | Cheng |
| 7,272,626 | B2 | 9/2007 | Sahai et al. |
| 7,290,056 | B1 | 10/2007 | McLaughlin, Jr. |
| 7,349,867 | B2 | 3/2008 | Rollins et al. |
| 7,552,205 | B2 | 6/2009 | Lamb et al. |
| 7,568,023 | B2 | 7/2009 | Green |
| 2002/0007330 | A1 | 1/2002 | Kumar et al. |
| 2002/0026535 | A1 | 2/2002 | Srinivasan |
| 2002/0120727 | A1 | 8/2002 | Curley et al. |
| 2002/0129137 | A1 | 9/2002 | Mills, III |
| 2002/0147570 | A1 | 10/2002 | Kraft et al. |

(Continued)

FOREIGN PATENT DOCUMENTS

EP 1202528 A2 2/2002

OTHER PUBLICATIONS

IBM, "Method for tracking composite transactions in the Enterprise using Application Programming Interfaces (APIs)", www.ip.com, IPCOM000184086D, Jun. 10, 2009.

(Continued)

*Primary Examiner* — H S Sough
*Assistant Examiner* — Kimberly Jordan
(74) *Attorney, Agent, or Firm* — Brevetto Law Group

(57) ABSTRACT

A first subset of information about a transaction is received from a first application. The first application has a first monitoring technique. A second subset of information about the transaction is received from a second application. The second application has a second monitoring technique that is different from the first monitoring technique. The first subset of information is combined with the second subset of information to produce composite information about the transaction.

19 Claims, 26 Drawing Sheets

(56) References Cited

U.S. PATENT DOCUMENTS

| | | |
|---|---|---|
| 2002/0163704 A1 | 11/2002 | Hayashi |
| 2002/0198984 A1 | 12/2002 | Goldstein et al. |
| 2003/0014464 A1 | 1/2003 | Deverill et al. |
| 2003/0182318 A1 | 9/2003 | Goldberg et al. |
| 2003/0217130 A1 | 11/2003 | Tang et al. |
| 2003/0217311 A1 | 11/2003 | Smith |
| 2003/0225760 A1 | 12/2003 | Ruuth |
| 2004/0064552 A1 | 4/2004 | Chong et al. |
| 2004/0075690 A1 | 4/2004 | Cirne |
| 2004/0123293 A1 | 6/2004 | Johnson |
| 2004/0237093 A1 | 11/2004 | Sluiman et al. |
| 2005/0149601 A1 | 7/2005 | Cox et al. |
| 2005/0251574 A1 | 11/2005 | Chagoly et al. |
| 2006/0031466 A1 | 2/2006 | Kovach |
| 2007/0060367 A1 | 3/2007 | Heler |
| 2007/0294224 A1 | 12/2007 | Heler |
| 2008/0059625 A1 | 3/2008 | Barnett et al. |
| 2008/0086285 A1 | 4/2008 | Gombas et al. |
| 2008/0262797 A1 | 10/2008 | Carusi |
| 2008/0306711 A1 | 12/2008 | Bansal |
| 2009/0113042 A1 | 4/2009 | Bivens et al. |
| 2009/0125532 A1 | 5/2009 | Wexler et al. |
| 2009/0150908 A1 | 6/2009 | Shankaranarayanan |
| 2009/0193111 A1 | 7/2009 | Sengupta et al. |
| 2009/0216874 A1 | 8/2009 | Thain |
| 2011/0087722 A1 | 4/2011 | Clementi |
| 2011/0088042 A1 | 4/2011 | Clementi |
| 2011/0088045 A1 | 4/2011 | Clementi |

OTHER PUBLICATIONS

Ashley Neil Clementi, et al, "Stitching Transactions", U.S. Appl. No. 12/576,172, filed Oct. 8, 2009.

Ashley Neil Clementi, et al, "Processing Transaction Timestamps", U.S. Appl. No. 12/576,177, filed Oct. 8, 2009.

Ashley Neil Clementi, et al, "Linking Transactions", U.S. Appl. No. 12/576,180, filed Oct. 8, 2009.

U.S. Appl. No. 11/424,685 Advisory Action mailed Jan. 16, 2009.

U.S. Appl. No. 11/424,685 Final Office Action mailed Oct. 31, 2008.

U.S. Appl. No. 11/424,685 Non-Final Office Action mailed Mar. 18, 2008.

U.S. Appl. No. 11/424,685 Notice of Abandonment mailed May 22, 2009.

U.S. Appl. No. 11/424,685 Response filed Dec. 29, 2008.

U.S. Appl. No. 11/424,685 Response filed Jun. 15, 2008.

Mark W. Johnson; "Monitoring and Diagnosing Applications with ARM 4.0"; Dec. 15, 2004; pp. 1-12; IBM Corp.; New York, NY; USA.

Franco Zambonelli et al.; "Developing Multiagent Systems: The Gaia Methodology; Jul. 2003"; pp. 1-54; vol. 12, No. 3; ACM Transactions on Software Engineering and Methodology; New York, NY; USA.

Christoph Liebig et al; "Middleware Mediated Transactions"; Sep. 2001; pp. 1-11; IBM Corp.; New York, NY, USA.

Steven O. Kimbrough; On Automated Message Processing in Electric Commerce and Work Support Systems: Speech Act Theory and Expressive Felicity; Jan. 2, 1997; pp. 1-62; vol. 15(4); ACM Transactions on Information Systems; New York, NY; USA.

Charles Babcock; "Tracking Errant Information" Nov. 3, 2003; pp. 1-2; InformationWeek; can be found at http://www.informationweek.com//news/15800202.

* cited by examiner

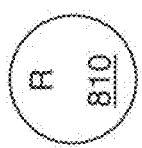
FIG. 9

COMBINING MONITORING TECHNIQUES

CROSS-REFERENCE TO RELATED APPLICATIONS

The present application is related to the following commonly assigned patent applications: U.S. patent application Ser. No. 12/576,172, entitled "STITCHING TRANSACTIONS" by Ashley Clementi et al.; U.S. patent application Ser. No. 12/576,177, entitled "PROCESSING TRANSACTION TIMESTAMPS" by Ashley Clementi et al.; and U.S. patent application Ser. No. 12/576,180, entitled "LINKING TRANSACTIONS" by Ashley Clementi et al., all of which were filed on Oct. 8, 2009, and are incorporated herein by reference in their entirety for all purposes.

FIELD OF DISCLOSURE

The present disclosure relates to monitoring transactions.

BACKGROUND

Transactions may flow through more than one application environment.

SUMMARY

According to some embodiments, a first subset of information about a transaction is received from a first application. The first application has a first monitoring technique. A second subset of information about the transaction is received from a second application. The second application has a second monitoring technique that is different from the first monitoring technique. The first subset of information is combined with the second subset of information to produce composite information about the transaction.

The foregoing is a summary and thus contains, by necessity, simplifications, generalizations, and omissions of detail; consequently, those skilled in the art will appreciate that the summary is illustrative only and is not intended to be in any way limiting. Other features will become apparent in the non-limiting detailed description set forth below.

BRIEF DESCRIPTION OF THE DRAWINGS

The teachings of the present disclosure may be better made apparent to those skilled in the art by referencing the accompanying drawings, wherein:

FIG. 9 illustrates each application's respective visibility of the application environments used in the example of FIG. 8 in the absence of any integration

DETAILED DESCRIPTION

Figure 1:
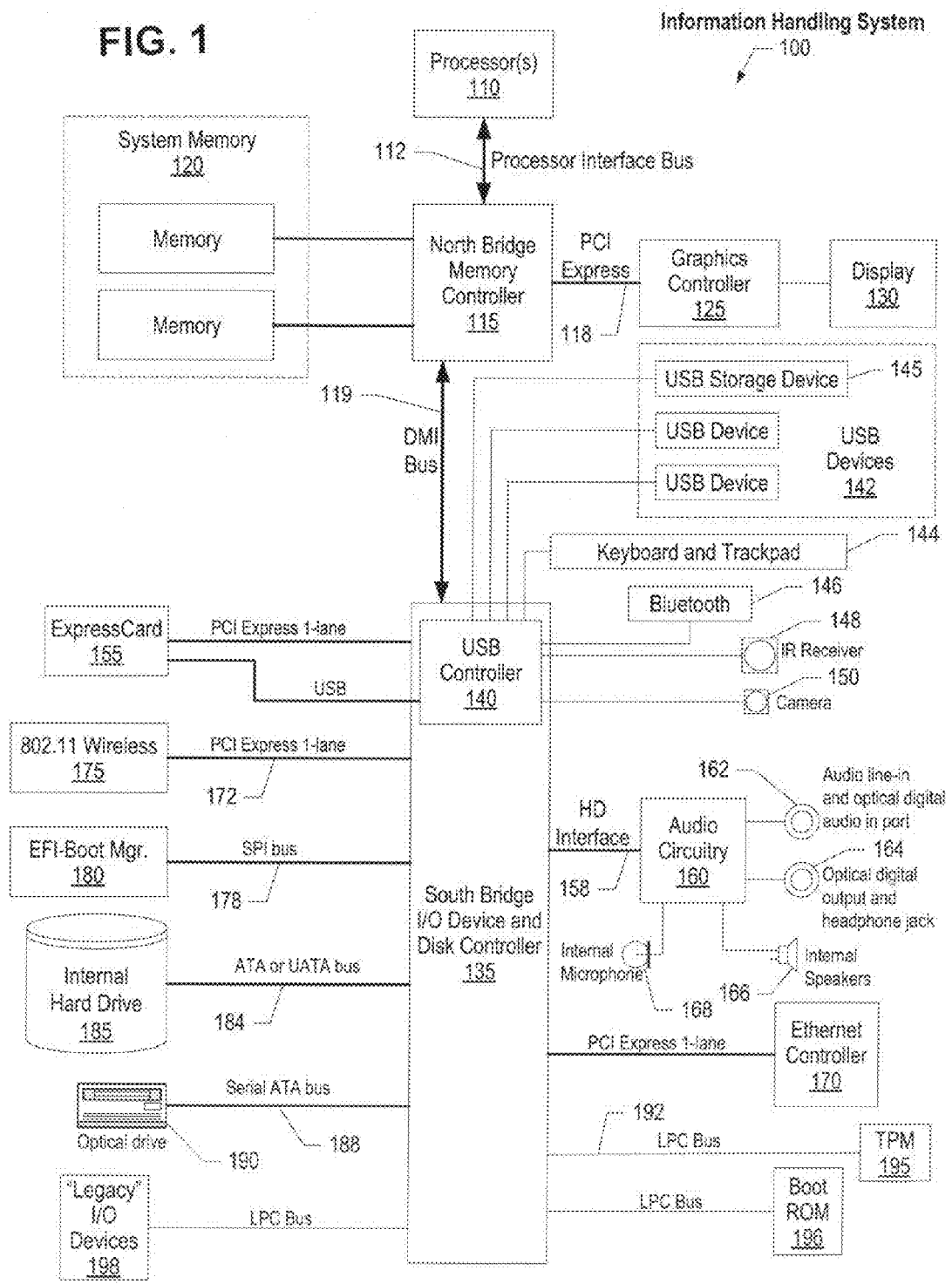
FIG. 1 is a block diagram example of a data processing system in which the methods described herein can be implemented.

Certain specific details are set forth in the following description and figures to provide a thorough understanding of various embodiments of the disclosure. Certain well-known details often associated with computing and software technology are not set forth in the following disclosure, however, to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure. Instead, the following is intended to provide a detailed description of an example of the disclosure and should not be taken to be limiting of the disclosure itself. Rather, any number of variations may fall within the scope of the disclosure, which is defined by the claims that follow the description.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

With the advent of the Internet and Web computing, enterprises have expanded their information technology (IT) to more distributed environments, while keeping portions of their business logic in a traditional mainframe environment using legacy systems. A legacy software system may be a non-J2EE software system. Examples of legacy software systems include IBM® (Registered trademark of International Business Machines Corporation) Customer Information Control System (CICS® (Registered trademark of International Business Machines Corporation)), IBM Information Management System (IMS™ (Trademark of International Business Machines Corporation)), and DB2® (Registered trademark of International Business Machines Corporation). Along with distributed environments, software systems such as Web servers and application servers, for example, Java® 2 Platform Enterprise Edition (J2EE® (Java and all Java-based trademarks are trademarks of Sun Microsystems, Inc. in the United States, other countries, or both)) servers, have come along to provide on-line access through the World Wide Web. However, transactions may still be processed through the legacy software systems. For example, they may use synchronous gateways or asynchronous messaging systems such as IBM WebSphere® (Registered trademark of International Business Machines Corporation) MQSeries® (Registered trademark of International Business Machines Corporation). As a result, the processing of a transaction may not be confined to one application server or system.

A transaction may include composite transactions and business transactions, and may be executed in one or more application environment(s). A transaction may be initiated at a client or desktop, such as for example, Personal Computer 250, may traverse a network, such as, for example, Computer Network 200, may traverse one or more application environment(s), and may return to the client or desktop. A transaction may be a synchronous transaction and/or an asynchronous transaction. For example, the processing of the transaction may flow from a Web server to an application server all the way to a legacy software system and back. The transaction may include multiple local, or sub-, transactions.

A local transaction is a part of a transaction which executes in a single application environment, i.e., it is "local" to that particular application environment. The local transaction may execute in a specific region of an application environment. A local transaction that combines with other local transactions to form a transaction may be referred to as a subtransaction.

An application environment includes a set of protocols and services which host the execution of a transaction, and may span one or more server platforms. An application environment may include one or more of the following: a web server, a mainframe, a distributed application, an application server, a webserver farm, WebSphere Application Servers (WAS), Customer Information Control (CICS), Information Management System (IMS), WebSphere MQ, Database 2(DB2), SAP, DataPower, a domain, and/or any other application environments as known in the art.

A region may be a part of an application environment where execution resources are directly addressable by programs using common programming languages. A region may also be referred to as an address space or a process.

Figure 2:
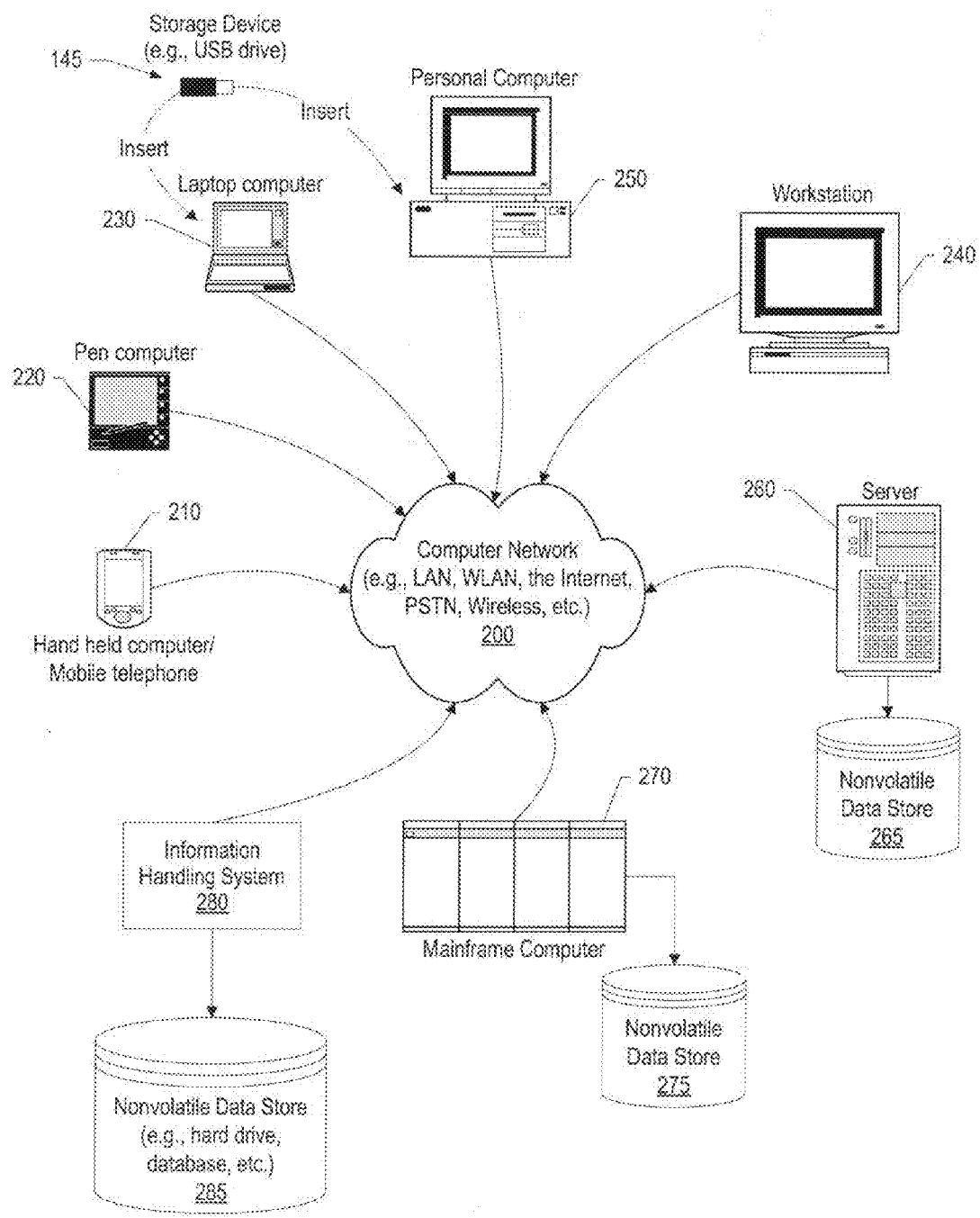
FIG. 2 provides an extension example of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wirelessly communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension example of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
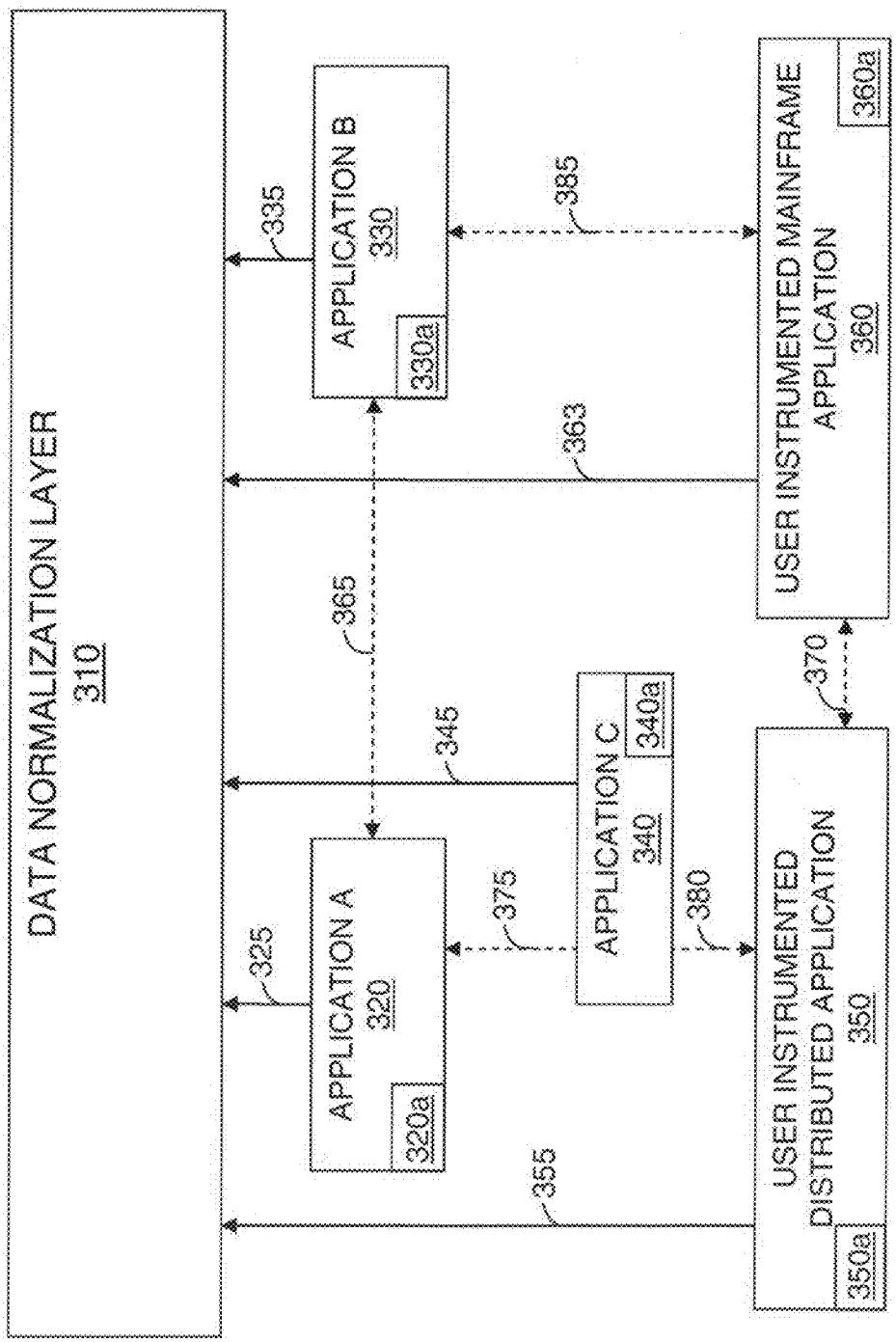
FIG. 3 is a diagram according to an embodiment of the invention.

FIG. 3 is a diagram according to an embodiment of the invention. FIG. 3 includes an application programming interface (API) driven data normalization layer 310. The data normalization layer 310 may be coupled to application A 320 by API invocation 325, application B 330 by API invocation 335, and application C 340 by API invocation 345, user instrumented distributed application 350 by API invocation 355, and a user instrumented mainframe application 360 by API invocation 363. Each of application A 320, application B 330, application C 340, user instrumented distributed application 350, and user instrumented mainframe application 360 may be a product, an instrumentation, and/or a scope. Additionally, each application may include one or more monitoring agents, an application A monitoring agent 320a, an application B monitoring agent 330a, an application C monitoring agent 340a, a user instrumented distributed application monitoring agent 350a, and a user instrumented mainframe application monitoring agent 360a, respectively. A monitoring agent may include anything else that may invoke an API and/or monitor an application environment, including a human user. Monitoring includes tracking. An API may be invoked either directly or a wrapper may be provided to map specific correlation technique primitives into primitives implemented by the API.

As illustrated in the example of FIG. 3, application A 320 is horizontally integrated 365 with application B 330; and user instrumented distributed application 350 is horizontally integrated 370 with user instrumented mainframe application 360. Also, application C 340 is vertically integrated 375 with product A 320. Application C 340 is also vertically integrated 380 with user instrumented distributed application 350. Product B 330 is vertically integrated 385 with user instrumented mainframe application 360.

Figure 4:
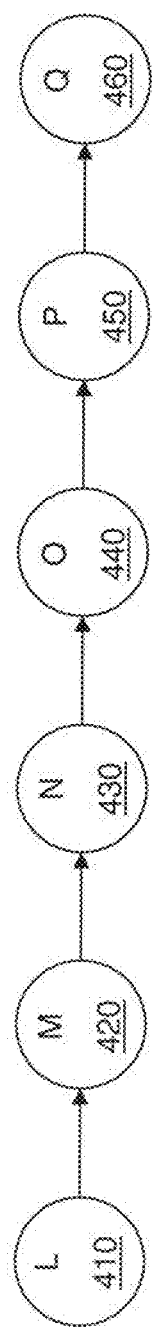
FIG. 4 is a simplified example of a plurality of application environments that a transaction may cross.

FIG. 4 is a simplified example of a plurality of application environments that a transaction may traverse. For example, the transaction may cross application environment L 410, application environment M 420, application environment N 430, application environment O 440, application environment P 450, and application environment Q 460.

Figure 5:
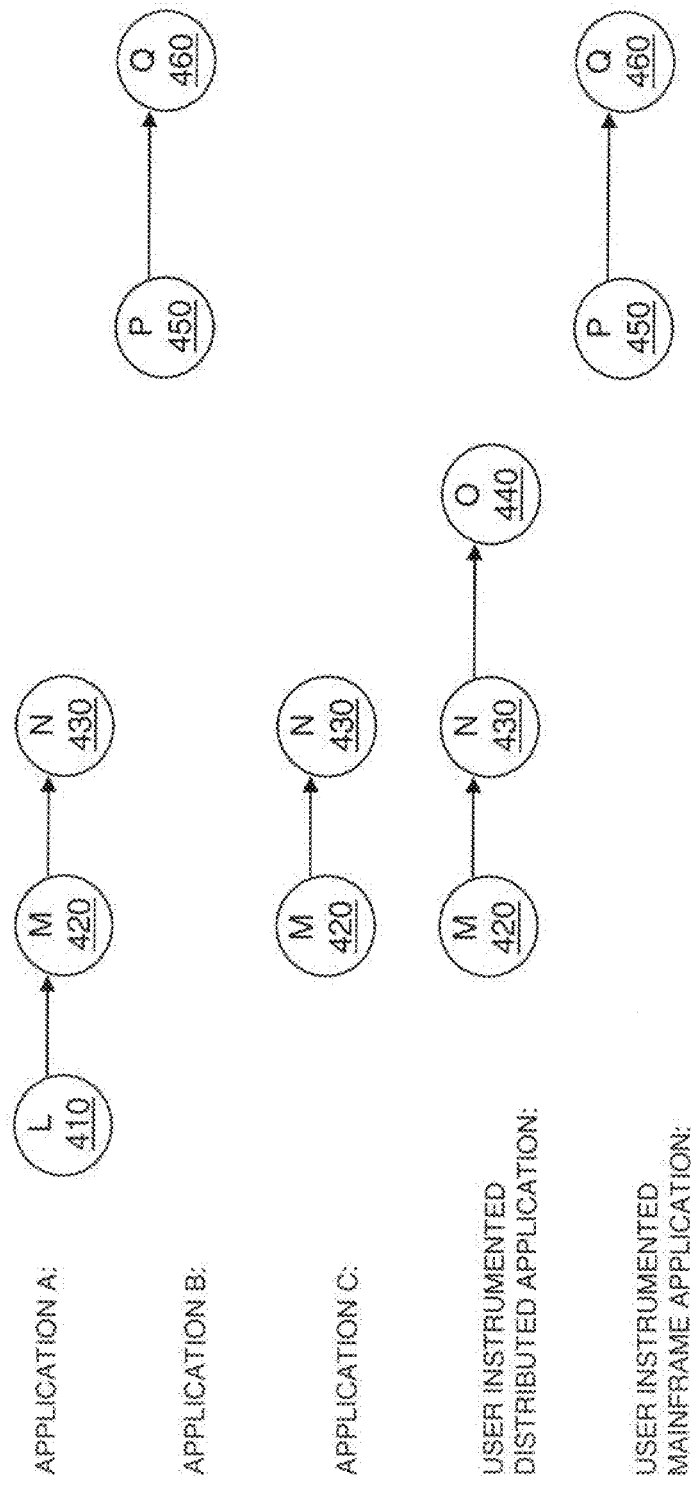
FIG. 5 illustrates each application's respective visibility of the application environments used in the example of FIG. 4 in the absence of any integration.

FIG. 5 depicts a visibility of application A 320, application B 330, application C 340, user instrumented distributed application 350, and user instrumented mainframe application 360, of the transaction across the plurality of application environments L 410, M 420, N 430, O 440, P 450, and Q 460 in the absence of any additional integration.

In this example, application A 320 includes one or more monitoring agents capable of monitoring application environment L 410, application environment M 420, and application environment N 430. In other words, application A 320 has visibility in environment L 410, application environment M 420, and application environment N 430, and can therefore monitor the transaction through those environments. Application B has visibility in application environment P 450 and application environment Q 460. Application C has visibility in application environment M 420 and application environment N 430. User instrumented distributed application 350 has visibility in application environment M 420, application environment N 430, and application environment O 440. User instrumented mainframe application 360 has visibility in application environment P 450 and application environment Q 460. However, none of the applications in the example have an end-to-end visibility of the transaction. Additionally, the applications may not be able to use monitoring information from the other applications, without invoking the APIs utilizing the data normalization layer 310.

Figure 6:
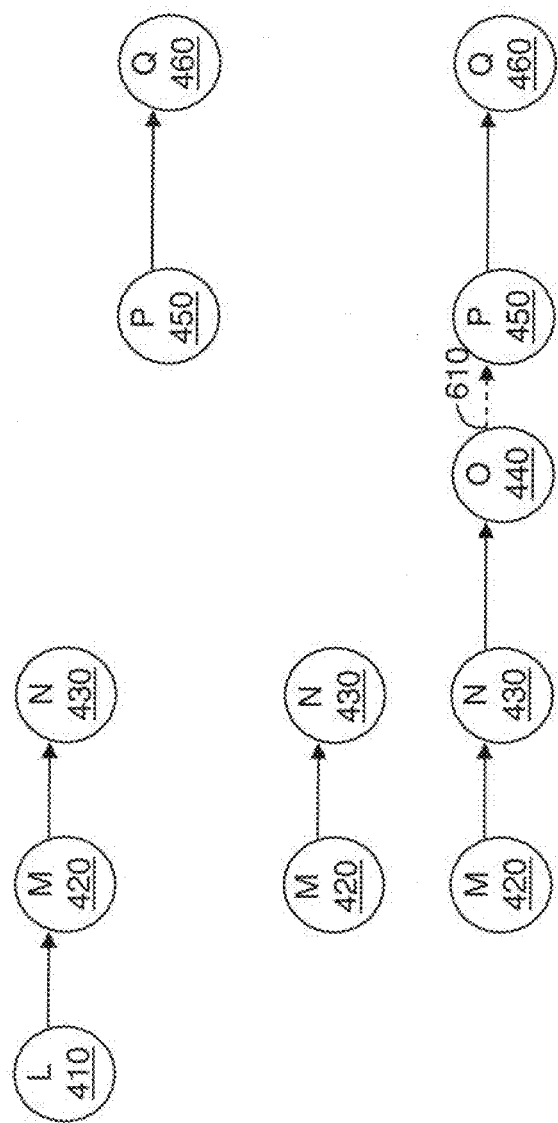
FIG. 6 is a modified drawing of FIG. 5 that is updated to illustrate an example of horizontal integration.

FIG. 6 is a modified drawing of FIG. 5 that is updated to illustrate an example of horizontal integration. Horizontal integration may occur when certain parameters are specified to the APIs to allow the data normalization layer 310 to horizontally integrate consecutive application environments. Horizontal integration 610 is performed to correlate application environment O 440 (as visible to the user instrumented distributed application 350) and application environment P 450 (as visible to the user instrumented mainframe application 360). Horizontal integration 610 may include a horizontal stitch, a horizontal link, any combination of horizontal stitching and linking, and/or any other horizontal integration. Horizontal integration may be used to couple one application's visibility to another application's visibility. Although the visibility of each application includes consecutive application environments, one of ordinary skill in the art will easily recognize that the monitoring agents of an application may also be able to monitor a plurality of application environments that are not consecutive; however, this may require additional integrations.

Figure 7:
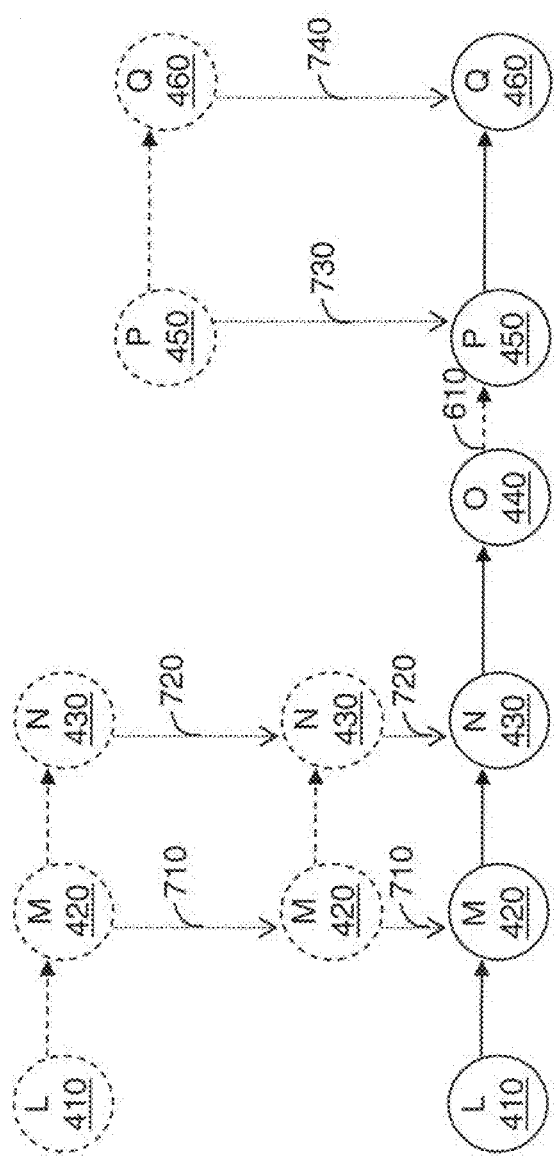
FIG. 7 is a modified drawing of FIG. 6 that is updated to illustrate examples of vertical integration.

FIG. 7 is a modified drawing of FIG. 6 that is updated to illustrate examples of vertical integration. Vertical integration may occur when certain parameters are specified to the APIs to allow the data normalization layer 310 to vertically integrate redundant views of application environments. Vertical integration 710 integrates views of application environment M 420 from application A 320, application C 340, and user instrumented distributed application 350. Vertical integration 720 integrates views of application environment N 430 from application A 320, application C 340, and user instrumented distributed application 350. Vertical integration 730 integrates views of application environment P 450 from application B 330 and user instrumented mainframe application 360. Vertical integration 740 integrates views of application environment Q 460 from application B 330 and user instrumented mainframe application 360. Vertical integrations 710, 720, 730, and 740 may include a vertical stitch, a vertical link, any combination of vertical stitching and link linking, and/or any other vertical integration. Vertical integration may be used to recognize that an application environment has been monitored a plurality of times and to suppress redundancies.

As a result of the horizontal integration 610 coupling consecutive application environments and the vertical integrations 710, 720, 730, and 740 removing redundancies, a complete end-to-end view of the transaction may be provided. This end-to-end view may show the application environments illustrated in FIG. 4 that the transaction may flow through.

Embodiments of the invention may provide APIs that may be invoked at certain measurement points in a life of a local transaction. Embodiments may use measurement point data received through APIs to correlate local transactions, monitor a transaction, and/or provide an end-to-end view of a transaction. In an example, APIs may take the form Point (timestamp, vertical link-id, vertical stitch list, horizontal link-id, horizontal stitch list, context), where Point is a type of measurement point, and timestamp, vertical link-id, vertical stitch list, horizontal link-id, horizontal stitch list, and context are parameters.

In an example, the type of measurement point may be: STARTED, FINISHED, OUTBOUND, INBOUND, or HERE. A STARTED measurement point may be a point taken when the local transaction starts. A FINISHED measurement point may be a point taken when the local transaction ends. An OUTBOUND measurement point may be a point taken when the transaction leaves the local transaction for another local transaction in a different region. Processing may either block (synchronous model) or continue (asynchronous model) in the local transaction. An INBOUND measurement point may be a point taken when the transaction enters the local transaction from another local transaction in a different region. A HERE measurement point may be a point taken anywhere in the local transaction between, and including, the STARTED and FINISHED points.

Timestamp may be a standardized timestamp for a measurement point. Context may be general information about the local transaction that may not be used to couple or merge local transaction instances, but instead may be for display or reporting purposes.

Vertical link-id may be a string that uniquely identifies the local transaction and therefore may be the same for all measurement points between and including STARTED and FINISHED. The vertical link-id may be used to link together two points within the local transaction.

Vertical stitch list may be a list of NAME/VALUE pairs which may used to vertically stitch local transaction instances that are identical (for example, when there are several applications monitoring the same local transaction). A NAME may be a description of a value, and the VALUE may be the value itself.

Horizontal link-id may be a string which uniquely identifies a one-directional trip defined when the transaction leaves a local transaction (OUTBOUND) and enters another local transaction (INBOUND). Therefore a horizontal link-id of an OUTBOUND point in the source local transaction may be the same as a horizontal link-id of an INBOUND point in a destination local transaction. The horizontal link-id may be used to couple two distinct local transactions at specific points. The horizontal link-id may be used to link together two different measurement points located in two separate local transactions.

Horizontal stitch list may be a list of NAME/VALUE pairs which may be used to horizontally stitch (couple) two distinct local transaction instances at arbitrary points (not necessarily OUTBOUND and INBOUND). The horizontal stitch list may be used when there is no horizontal link-id, when it is not possible to determine when the transaction left the local transaction or entered another local transaction, or any other time.

Figure 8:
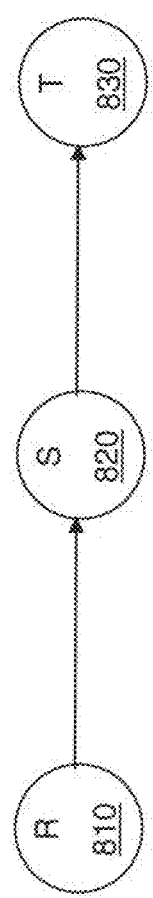
FIG. 8 is a simplified example of a plurality of application environments that a transaction may cross.

FIG. 8 is a simplified example of a plurality of application environments that a transaction may cross. This example includes application environment R 810, application environment S 820, and application environment T 830.

FIG. 9 depicts a visibility of application A 320 and application B 330 of the transaction across the application environments depicted in FIG. 8 in the absence of any integration. In this example, application A 320 includes one or more monitoring agents capable of monitoring application environment R 810; and application B 330 includes one or more monitoring agents capable of monitoring application environment S 820 and application environment T 830.

Figure 10:
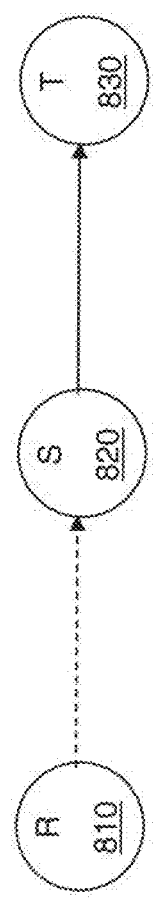
FIG. 10 is a modified drawing of FIG. 9 that is updated to illustrate an example of horizontal integration.

FIG. 10 is a modified drawing of FIG. 9 to illustrate an example of horizontal integration. Horizontal integration 1010 is performed to correlate application environment R 810 (as visible to application A 320) with application environment S 820 (as visible to application B 330). The horizontal integration is similar to the horizontal integration described above with reference to FIG. 6. As a result of the horizontal integration 1010 coupling application environments, a complete end-to-end view of the transaction may be provided. This end-to-end view may show the application environments illustrated in FIG. 8 that the transaction may cross.

Figure 11:
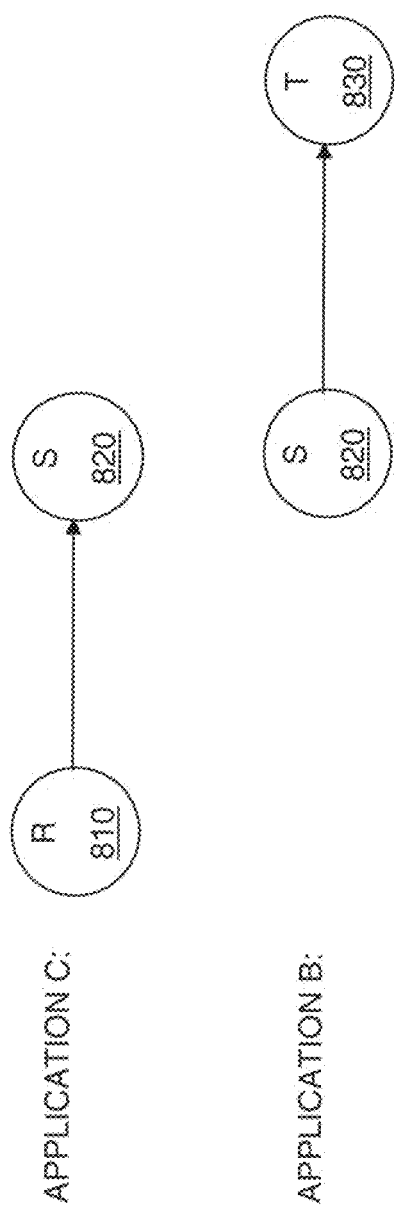
FIG. 11 illustrates each application's respective visibility of the application environments used in the example of FIG. 8 in the absence of any integration

FIG. 11 depicts a visibility of application C 340 and application B 330 of the transaction across the crossing the application environments depicted in FIG. 8 in the absence of any integration. In this example, application C 340 includes one or more monitoring agents capable of monitoring application environment R 810 and application S 820; and application B 330 includes one or more monitoring agents capable of monitoring application environment S 820 and application environment T 830.

Figure 12:
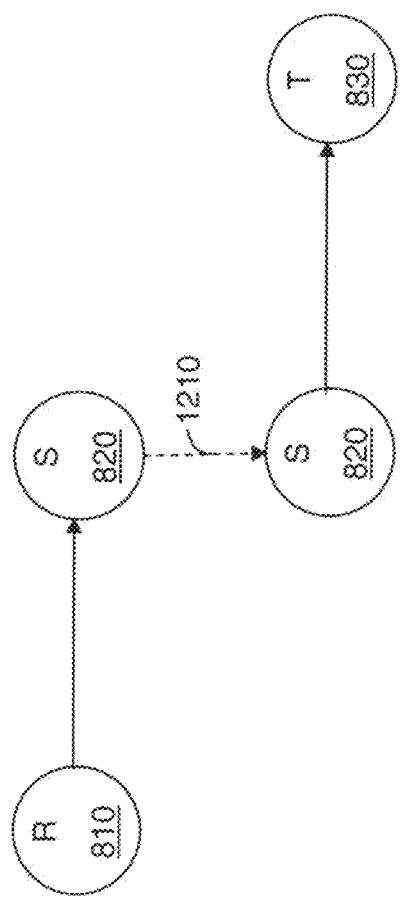
FIG. 12 is a modified drawing of FIG. 11 that is updated to illustrate an example of vertical integration.

FIG. 12 is a modified drawing of FIG. 11 to illustrate an example of vertical integration. Vertical integration 1210 integrates views of application environment S 820 from application C 340 and application B 330. The vertical integration is similar to the vertical integration described above with reference to FIG. 7. As a result of the vertical integration 1210, a complete end-to-end view of the transaction may be provided. This end-to-end view may show the application environments illustrated in FIG. 8 that the transaction may cross.

Figure 13:
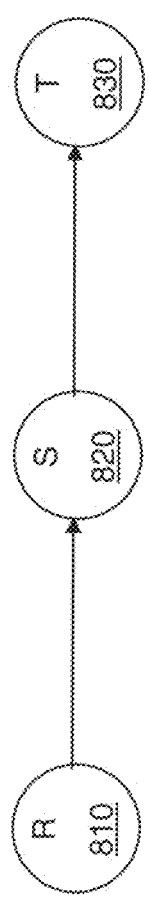
FIG. 13 is a modified drawing of FIG. 12 that is updated to illustrate an example of an end-to-end view of a transaction.

FIG. 13 is a modified drawing of FIG. 12 to illustrate the end-to-end view described in FIG. 12 without the dotted lines showing the vertical integration.

Figure 14:
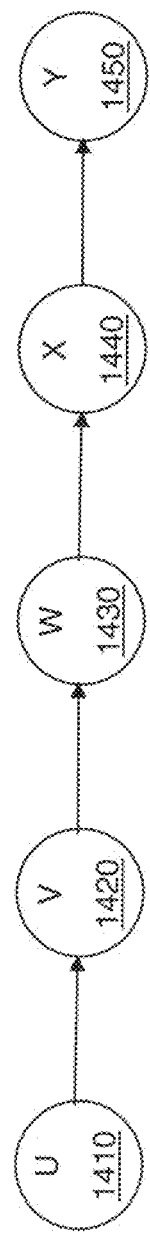
FIG. 14 is a simplified example of a plurality of application environments that a transaction may cross.

FIG. 14 is a simplified example of a plurality of application environments that a transaction may cross. This example includes application environment U 1410, application environment V 1420, application environment W 1430, application environment X 1440, and application environment Y 1450.

Figure 15:
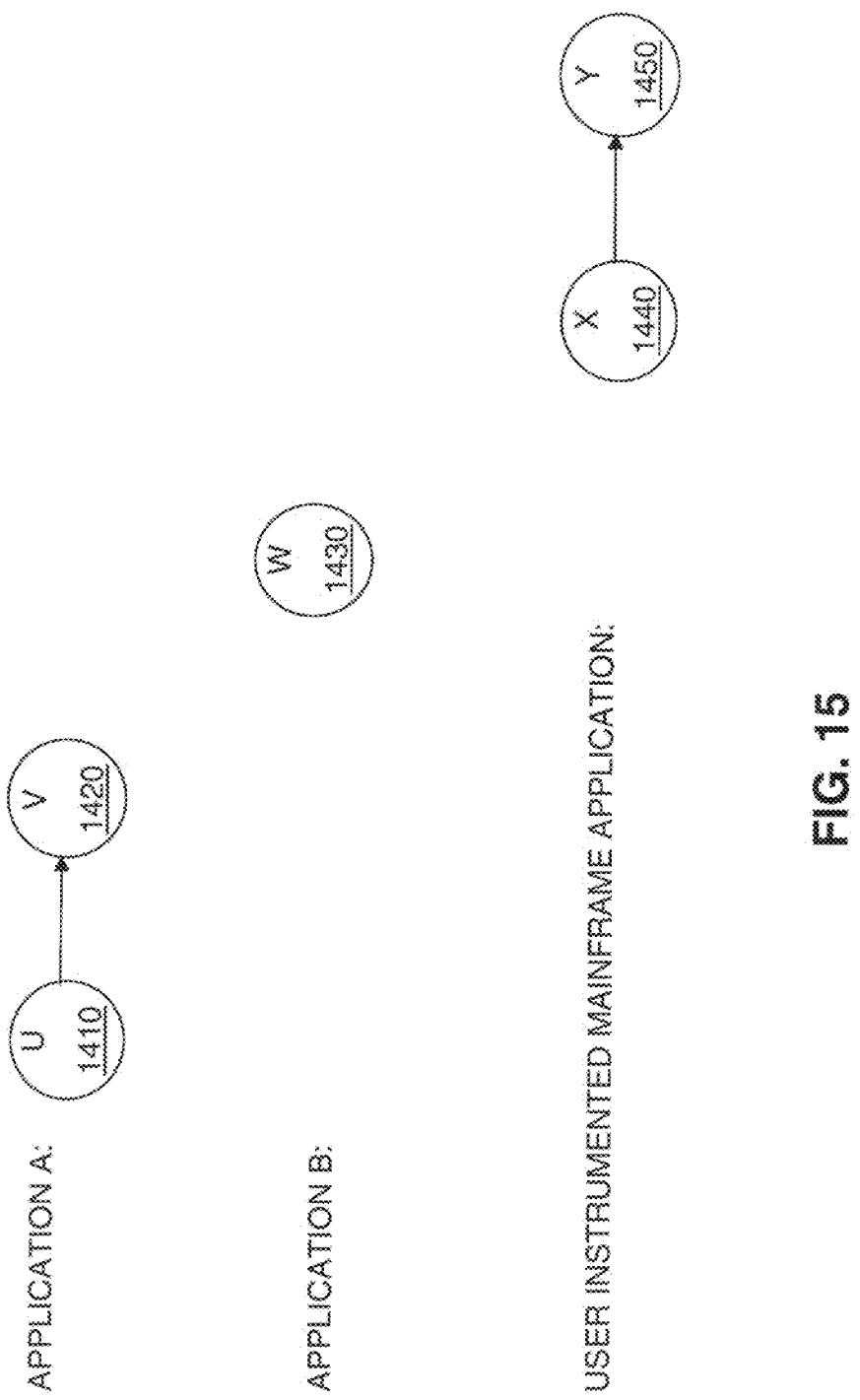
FIG. 15 illustrates each application's respective visibility of the application environments used in the example of FIG. 14 in the absence of any integration.

FIG. 15 depicts a visibility of application A 320, application B 330, and user instrumented mainframe application 360 of the transaction across the application environments depicted in FIG. 14 in the absence of any integration. In this example, application A 320 includes one or more monitoring agents capable of monitoring application environment U 1410 and application environment V 1420; application B 330 includes one or more monitoring agents capable of monitoring application environment W 1430; and user instrumented mainframe application 360 may include one or more monitoring agents capable of monitoring application environment X 1440 and application environment Y 1450.

Figure 16:
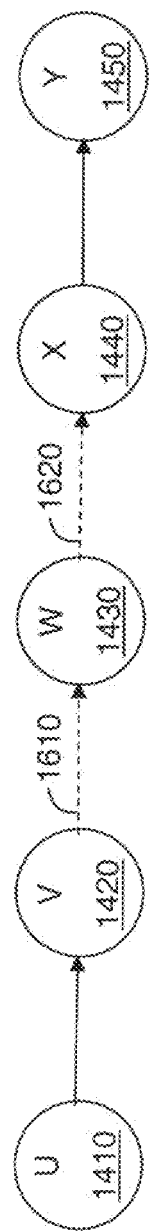
FIG. 16 is a modified drawing of FIG. 5 that is updated to illustrate an example of horizontal integration.

FIG. 16 is a modified drawing of FIG. 15 to illustrate an example of horizontal integration. Horizontal integration 1610 is performed to correlate application environment V 1420 (as visible to application A 320) with application environment W 1430 (as visible to application B 330). Horizontal integration 1620 is performed to correlate application environment W 1430 (as visible to application B 330) with application environment X 1440 (as visible to user instrumented mainframe application 360). The horizontal integration is similar to the horizontal integration described above with reference to FIG. 6. As a result of the horizontal integrations 1610 and 1620 coupling application environments, a complete end-to-end view of the transaction may be provided. This end-to-end view may show the application environments illustrated in FIG. 14 that the transaction may cross.

Figure 17:
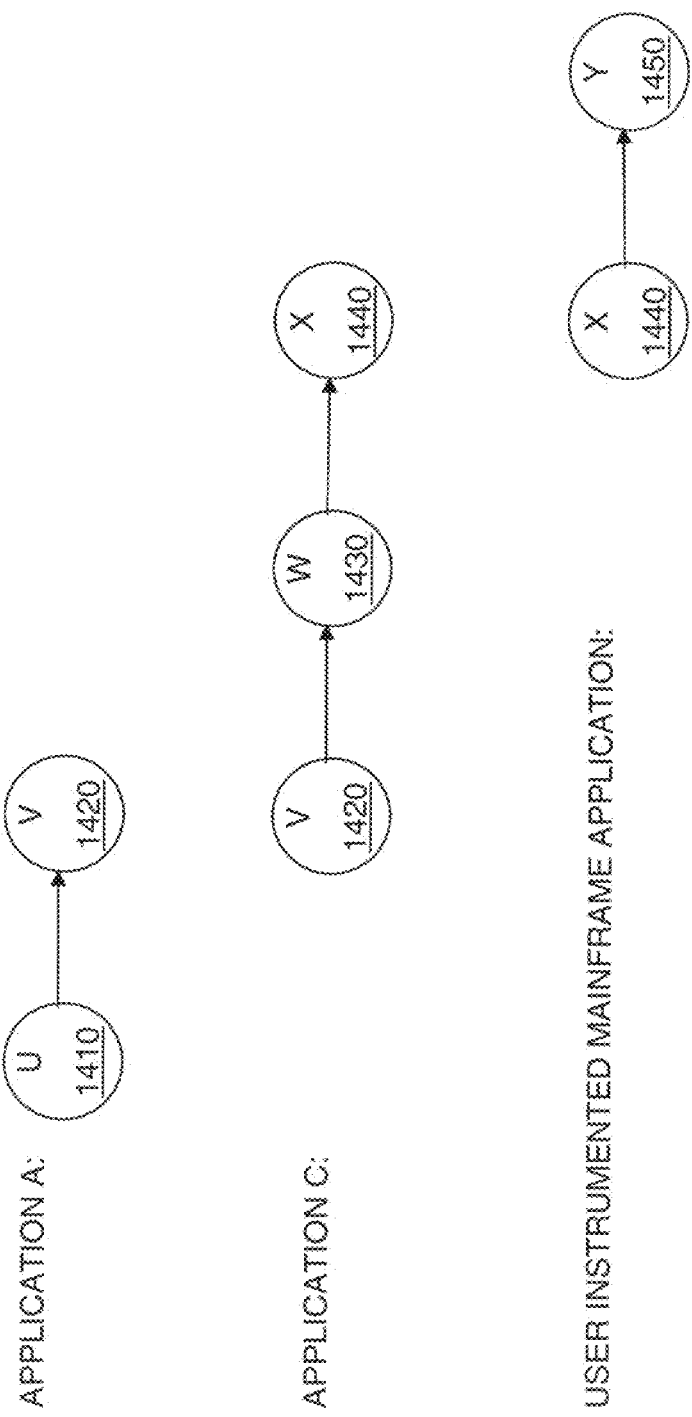
FIG. 17 illustrates each application's respective visibility of the application environments used in the example of FIG. 14 in the absence of any integration.

FIG. 17 depicts a visibility of application A 320 and application C 340 of the transaction across the application environments depicted in FIG. 14 in the absence of any integration. In this example, application A 320 includes one or more monitoring agents capable of monitoring application environment U 1410 and application environment V 1420; application C 340 includes one or more monitoring agents capable of monitoring application environment V 1420, application environment W 1430, and application X 1440; and user instrumented mainframe application 360 includes one or more monitoring agents capable of monitoring application environment X 1440 and application environment Y 1450.

Figure 18:
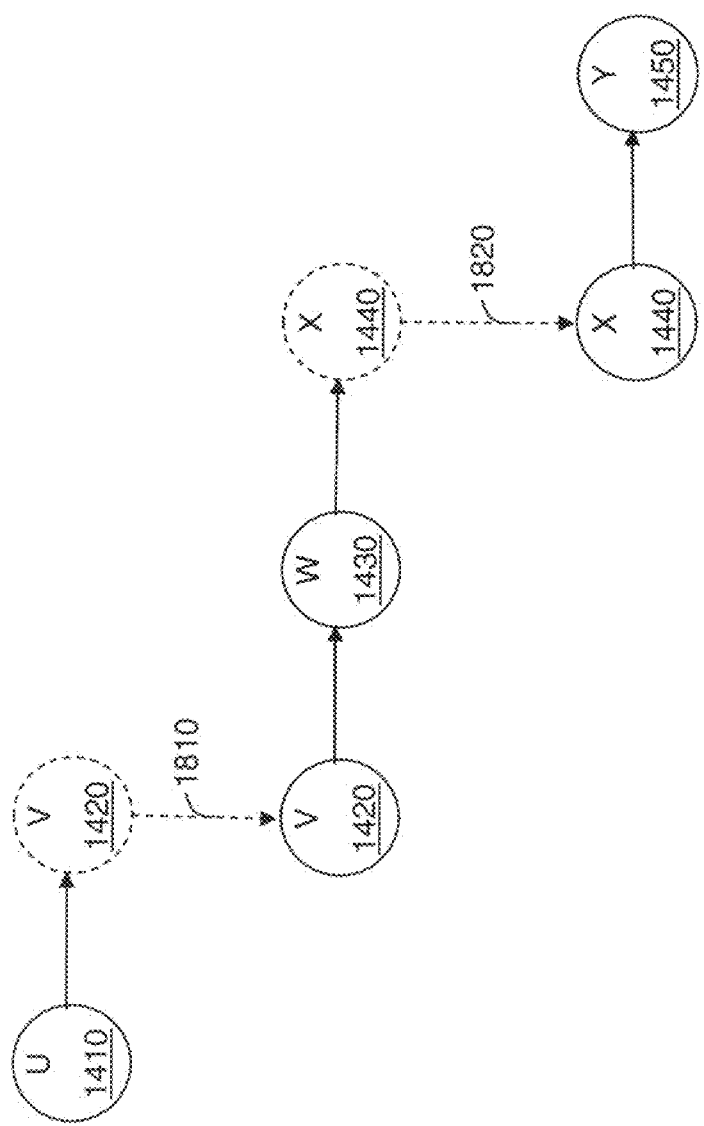
FIG. 18 is a modified drawing of FIG. 17 that is updated to illustrate an example of vertical integration.

FIG. 18 is a modified drawing of FIG. 17 to illustrate an example of vertical integration. Vertical integration 1810 integrates views of application environment V 1420 from application A 320 and application C 340; and vertical integration 1820 integrates views of application environment X 1440 from application environment C 340 and user instrumented mainframe application 360. The vertical integration is similar to the vertical integration described above with reference to FIG. 7. As a result of the vertical integrations 1810 and 1820, a complete end-to-end view of the transaction may be provided. This end-to-end view may show the application environments illustrated in FIG. 14 that the transaction may cross.

Figure 19:
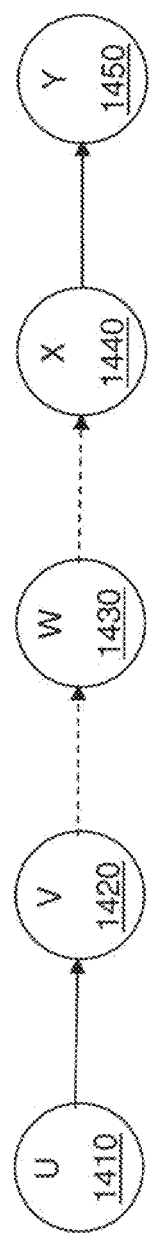
FIG. 19 is a modified drawing of FIG. 18 that is updated to illustrate an example of an end-to-end view of a transaction.

FIG. 19 is a modified drawing of FIG. 18 to illustrate the end-to-end view described in FIG. 18 showing the vertical integration.

Figure 20:
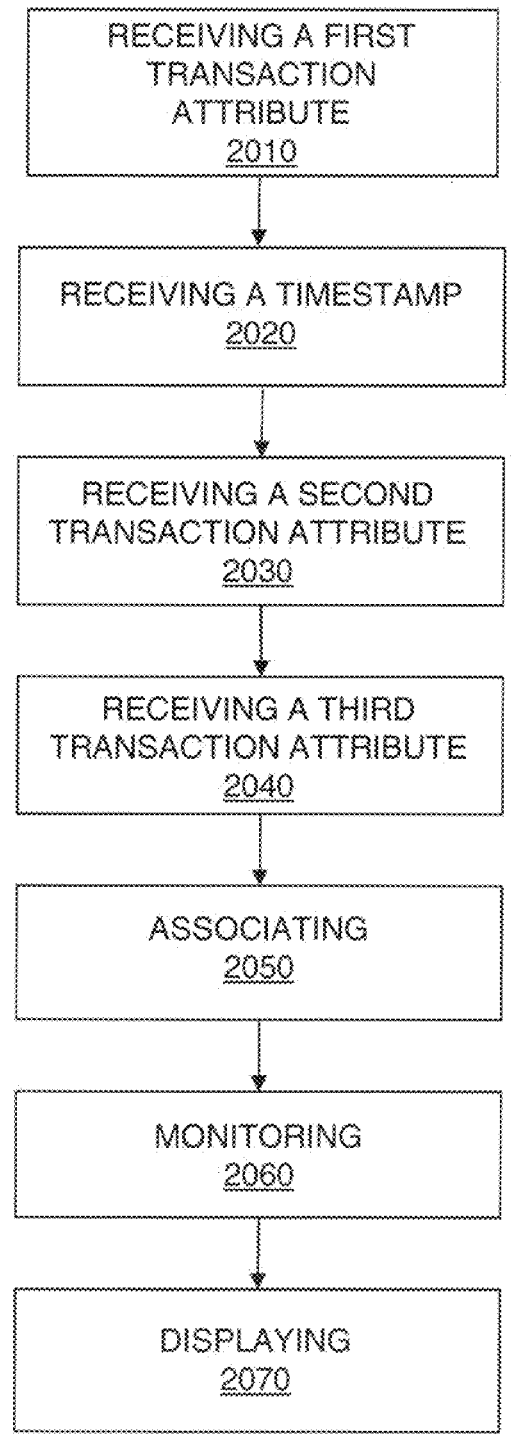
FIG. 20 illustrates an example method that can be used to implement an embodiment of stitching.

FIG. 20 illustrates an example method that can be used to implement an embodiment of stitching. At step 2010, a first transaction attribute may be received from a first monitoring agent. As an example, the first monitoring agent may be the application A monitoring agent 320a included in application A 320, described above with reference to FIG. 3. A monitoring agent may monitor a transaction within one or more application environment(s) of a plurality of application environments. A transaction attribute may be natural, artificial, or a combination of natural and artificial data.

A transaction attribute is considered to be natural if it is not artificially created and inserted by a monitoring agent. The transaction attribute may be natural because it is an inherent part of the transaction. A transaction attribute may be natural if it is created by a middleware layer, a network layer, or any other layer.

A transaction attribute is considered to be artificial if it is created by a monitoring agent. For example, a token may be generated using information that is not inherent to the transaction. The token may be injected into, or flown through, along with the transaction. The token may include information that would not have been included as part of the transaction if the transaction was not being monitored, and the token may be used to monitor the transaction.

The first transaction attribute may include a plurality of identifiers and may be associated with a transaction. The identifiers that make up the first transaction attribute may not be unique in and of themselves, but the combination of the plurality of unique identifiers may be reasonably unique. The identifiers may include at least one or more of the following: a string, a vector, a name/value pair, and/or any other identifying information.

At step 2020, a timestamp may be received from the first monitoring agent. The timestamp may be a standardized timestamp for a measurement point of the transaction. At step 2030, a second transaction attribute may be received from a second monitoring agent. By way of example, the second monitoring agent may be the application B monitoring agent 330a included in application B 330, described above with reference to FIG. 3. In some embodiments, the second monitoring agent may be the same monitoring agent as the first monitoring agent. The second transaction attribute may be associated with the transaction. At step 2040, a third transaction attribute may be received from a third monitoring agent. By way of example, the third monitoring agent may be user implemented mainframe application monitoring agent 360a included in the user implemented mainframe application 360, described above with reference to FIG. 3. The third transaction attribute may be associated with the transaction.

The first transaction attribute may be a subset of information associated with a first measurement point and may include a plurality of identifiers associated with the transaction. The second transaction attribute may be a subset of information associated with a second measurement point and may include a plurality of identifiers associated with the transaction. A subset of the first transaction attribute may be identical to a subset of the second transaction attribute. A local transaction may be executed in one of the application environments, and the first transaction attribute and the second transaction attribute may be associated with the local transaction. A first local transaction may be executed in a first application environment, and a second local transaction may be executed in a second application environment that is distinct from the first application environment. By way of example, the first application environment may be application environment R 810, and the second application environment may be application environment S 820, both described above with reference to FIG. 8. The third transaction attribute may be a subset of information associated with a third measurement point and may include a plurality of identifiers associated with the transaction.

A measurement point may be a boundary point. A boundary point is a point of exit or entry from or to a local transaction. Examples of boundary points include the INBOUND and OUTBOUND points previously described. A measurement point may be a nonboundary point. A nonboundary point is a point that is not a point of exit or entry from or to a local transaction. An example of a nonboundary point includes the HERE point described earlier.

At step 2050, the first measurement point in a first application environment may be associated with a second measurement point in a second application environment. The associating may include stitching. The associating may include using an API and/or a file to correlate the first transaction attribute with the second transaction attribute. An example of an API includes the data normalization layer 310, described above with reference to FIG. 3. An example of the type of file that may be used is an XML file. The file may be editable by a user to associate the first transaction attribute with the second transaction attribute. The file may be an external file.

At step 2060, the transaction may be monitored through a plurality of application environments by associating at least a portion of the first transaction attribute with at least a portion of the second transaction attribute. The portion of the first transaction may be a subset of the plurality of identifiers. Also, the first transaction attribute and the third transaction attribute may be used to monitor the transaction through a plurality of application environments.

If a first local transaction is executed in a first application environment, and a second local transaction is executed in a second application environment that is distinct from the first application environment, then the monitoring may include monitoring the first local transaction and the second local transaction across application environments.

At step 2070, a composite of data received from the first monitoring agent and the second monitoring agent may be displayed. As used in this application, displaying may be performed on a local system and/or on any system accessible through a network, such as, for example, Personal Computer 250 in FIG. 2.

As may be appreciated by one having reasonable skill in the art, stitching may include a 1:1 coupling, a 1:n coupling, an n:1 coupling, or and/or an n:n coupling. Stitching may include a horizontal integration, and/or it may include a vertical integration.

Figure 21:
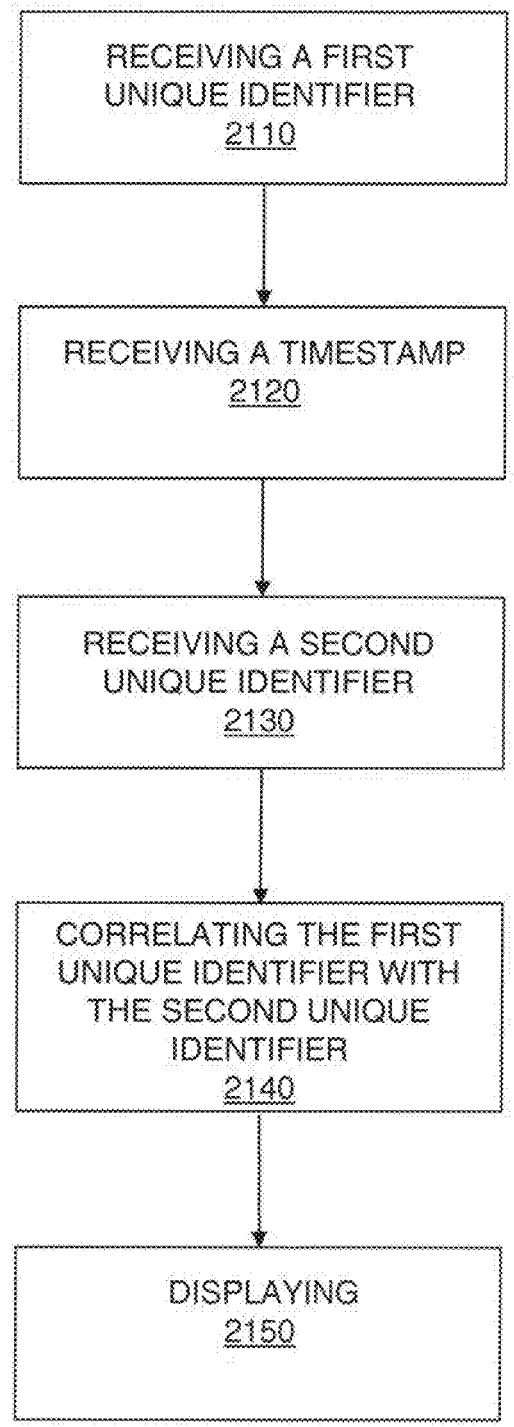
FIG. 21 illustrates an example method that can be used to implement an embodiment of linking.

FIG. 21 illustrates an example of a method that can be used to implement an embodiment of linking. At step 2110, a first unique identifier may be received from a first monitoring agent. By way of example, the first monitoring agent may be application A monitoring agent 320*a* included in application A 320, described above with reference to FIG. 3. The first unique identifier may be received via an API. First natural data may be associated with a transaction, and the first unique identifier may be based on the first natural data. The word "natural" is used here to describe data in a similar manner as it was used to describe a natural transaction attribute above with reference to FIG. 20. In embodiments, unique identifiers include a string and/or a plurality of strings. In embodiments, a unique identifier may be natural, artificial, and/or a combination of natural and artificial data. A unique identifier may be derived by concatenating a plurality of strings. A unique identifier may be a subset of information associated with a measurement point.

The first monitoring agent may monitor the transaction within one application environment of a plurality of application environments. The first monitoring agent may monitor the transaction within more than one of a plurality of application environments.

At step 2120, a timestamp may be received from the first monitoring agent. The timestamp may be a standardized timestamp associated with a measurement point of the transaction.

At step 2130, a second unique identifier may be received. The second unique identifier may be received from the first monitoring agent. The second unique identifier may be received from a second monitoring agent. By way of example, the second monitoring agent may be the application B monitoring agent 330*a* included in application B 330, described above with reference to FIG. 3. In some embodiments, the second monitoring agent may be the same monitoring agent as the first monitoring agent. Second natural data may be associated with the transaction, and the second unique identifier may be based on the second natural data.

At step 2140, the first unique identifier is correlated with the second unique identifier to monitor the transaction through a plurality of application environments. By way of example, the plurality of application environments could include application environment R 810, application environment S 820, and application environment T 830, as described above with reference to FIG. 8.

The first unique identifier may be correlated to the second unique identifier as a result of being a direct match. The correlating may be dynamic or hard-coded. Dynamic means that it is not hard coded. An example of dynamically correlating includes using an API. Dynamic correlating may be performed using an API to correlate the first unique identifier with the second unique identifier.

A first local transaction may be a subtransaction of the transaction, and a second local transaction may be another subtransaction of the transaction, and the first local transaction may be associated with the second local transaction.

A first local transaction may be executed in a first application environment, and a second local transaction may be executed in a second application environment, and the first local transaction and the second local transaction may be correlated across application environments. By way of example, the first application environment may include application environment R 810, and the second application environment may include application environment S 820, described above with reference to FIG. 8. A first local transaction and a second local transaction may occur in the same application environment, for example, application environment T 830, described above with reference to FIG. 8.

At step 2150, a composite of data received from the first monitoring agent and the second monitoring agent may be displayed.

Figure 22:
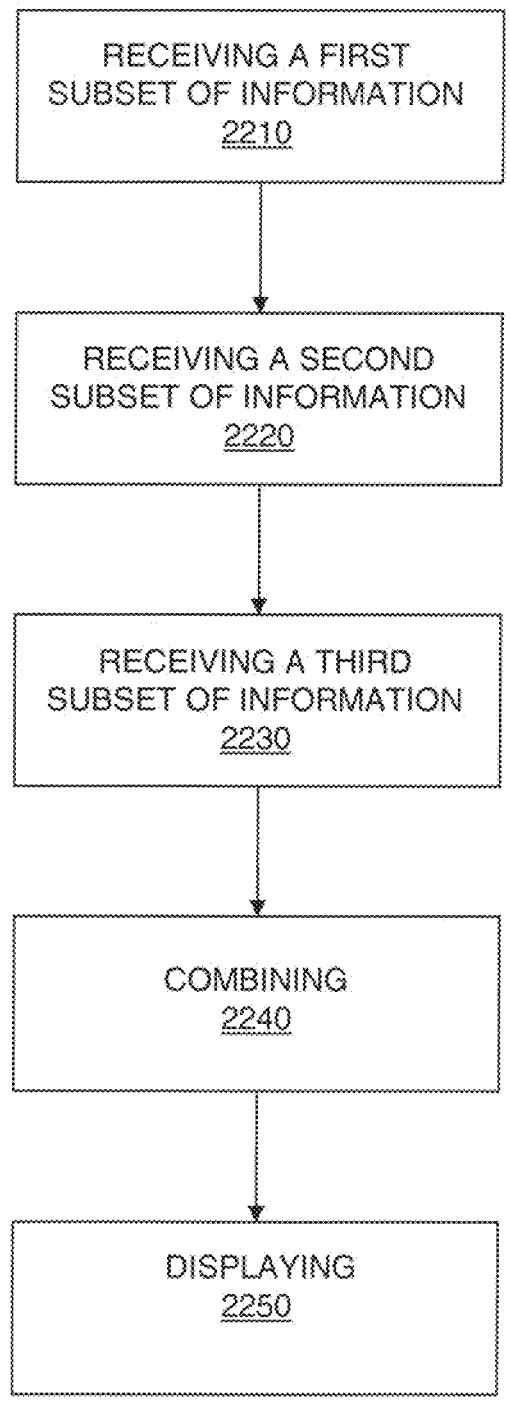
FIG. 22 illustrates an example method that can be used to combine monitoring techniques.

FIG. 22 illustrates an example of a method that may be used to combine monitoring techniques. At step 2210, a first subset of information about a transaction may be received from a first application. By way of example, the first application may be application A 320, described above with reference to FIG. 3. Subsets of information may describe a portion of the end-to-end view that an associated application has a view of. By way of example, FIG. 15 illustrates the views of application A 320, application B 330, and user instrumented mainframe application 360. The first application may have a first monitoring technique. A monitoring technique is a way to monitor at least a portion of a transaction. At step 2220, a second subset of information about the transaction may be received from a second application. By way of example, the second application may be application B 330, described above with reference to FIG. 3. The second application may have a second monitoring technique. The first monitoring technique may be different from the second monitoring technique. A first subset of information may be derived using a first specific monitoring technique, a second subset of information may be derived using a second specific monitoring technique, and combining the first subset of information with the second subset of information may be done using a generic monitoring technique. The applications may be made to be compatible with each other by data provided by the applications, even though the applications may not have been designed to be compatible.

At step 2230, a third subset of information about the transaction may be received from a third application. By way of example, the third application may be user instrumented mainframe application 360, described above with reference to FIG. 3. The first, second, and/or third subset of information may be received via an API. The first, second, and/or third subset of information may include overlapping data. The first, second, and/or third applications may not have knowledge of one or more of the other applications. The first, second, and/or third applications may not directly interact with one or more of the other applications. The first, second, and/or third applications may not individually have an end-to-end view of the transaction.

At step 2240, the first subset of information may be combined with the second subset of information to produce composite information about the transaction; and the third subset of information may be combined with the composite information resulting in further composite information. The combining may include integration by stitching and/or linking. The stitching and/or linking may be vertical and/or horizontal. The composite information and/or the further composite information may include an end-to-end view of the transaction. By way of example, an embodiment of composite information including an end-to-end view may be seen in FIGS. 10 and 13; and an embodiment of further composite information including an end-to-end view may be seen in FIGS. 16 and 19.

At step 2250, the composite information and/or the further composite information may be displayed.

Figure 23:
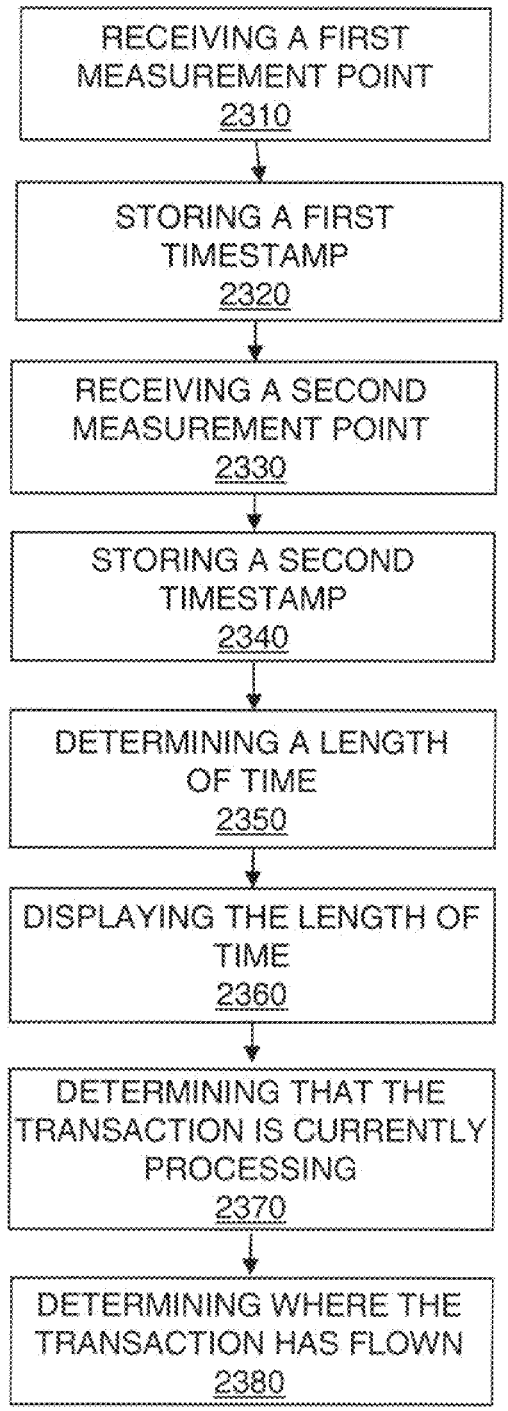
FIG. 23 illustrates an example method that can be used to implement an embodiment of timestamp processing.

FIG. 23 illustrates an example of a method that can be used to implement an embodiment of timestamp processing. At step 2310, a first measurement point may be received from a first monitoring agent. The first measurement point may include a first timestamp and a first transaction attribute. Measurement points may be received via an API. The first transaction attribute may include natural, artificial, and/or a combination of natural and artificial data.

At step 2320, the first timestamp may be stored. The first timestamp may be stored in a persistent storage medium, such as, for example, a hard disk.

At step 2330, a second measurement point may be received from a second monitoring agent. In some embodiments, the second monitoring agent may be the same monitoring agent as the first monitoring agent. The second measurement point may include a second timestamp and a second transaction attribute.

The first measurement point and the second measurement point may be any types of measurement points.

The first measurement point may be a first HERE point of a first local transaction. The second measurement point may be a second HERE point of a second local transaction. The first and second local transactions may be subtransactions of the transaction. The first and second HERE points may be used to associate the first and second local transactions.

The first measurement point may be an OUTBOUND point of a first local transaction indicating that the transaction has left the first local transaction for a second local transaction in a different application environment. The second measurement point may be an INBOUND point of the second local transaction indicating that the transaction has entered the second local transaction. The first and second local transactions may be subtransactions of the transaction.

At step 2340, the second timestamp may be stored. The second timestamp may be stored in a persistent storage medium.

At step 2350, a length of time the transaction took to flow from the first measurement point to the second measurement point may be determined using the first timestamp and the second timestamp. The first timestamp and the second timestamp may be retained in a persistent storage medium subsequent to determining the length of time the transaction took to flow from the first measurement point to the second measurement point.

The first measurement point may be a START point of a local transaction and the second measurement point may be an END point of the local transaction. The local transaction may be a subtransaction of the transaction. A response time of the local transaction may be determined for example, by using the first timestamp and the second timestamp. The response time may be displayed. The first timestamp and the second timestamp may be retained in a persistent storage medium subsequent to determining the response time.

At step 2360, the length of time the transaction took to flow from the first measurement point to the second measurement point may be displayed.

At step 2370, it may be determined that the transaction is currently processing in an application environment identified by the second measuring point.

At step 2380, the first measurement point and the second measurement point may be used to determine where the transaction has flown.

Figure 24:
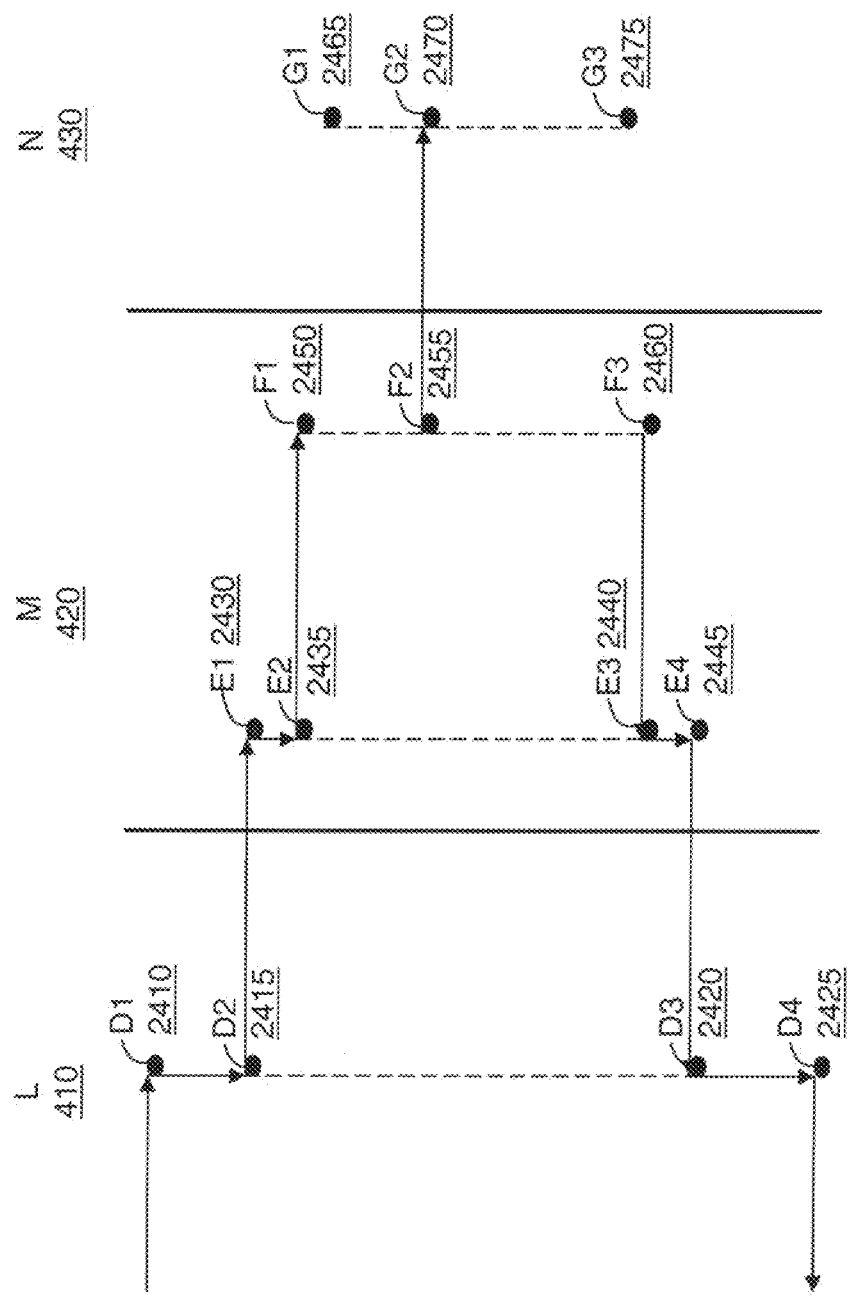
FIG. 24 depicts an example of an instance of a transaction traversing a plurality of application environments.

FIG. 24 depicts an example of an instance of a transaction traversing a plurality of application environments. The instance includes application environment L 410, application environment M 420, and application environment N 430. Application environment L includes measurement point D1 2410, measurement point D2 2415, measurement point D3 2420, and measurement point D4 2425. Each of these measurement points specify the same vertical link-id D. A vertical link-ID may be used to identify local transactions. Local transaction A is the only local transaction illustrated for application environment L 410.

Application environment M 420 includes measurement point E1 2430, measurement point E2 2435, measurement point E3 2440, and measurement point E4 2445. Each of these measurement points specifies the same vertical link-id E. Application M 420 also includes measurement point F1 2450, measurement point F2 2455, and measurement point F3 2460. Each of these measurement points specifies the same vertical link-id F. In other words, E and F are two local transactions within the same application environment.

Application environment N 430 includes measurement point G1 2465, measurement point G2 2470, and measurement point G3 2475. Each of these measurement points specifies the same vertical link-id G.

In this example, the transaction may execute in one region in application environment L 410. The transaction may execute as a local transaction identified by the vertical link-id D. The transaction may then leave application environment L 410 to enter application environment M 420.

In application environment M 420, the transaction may first execute as a local transaction identified by the vertical link-id E. The transaction may then execute as a local transaction identified by the vertical link-id F. The transaction may then leave application environment M 420 to enter application environment N 430.

In application environment N 430 the transaction may execute as a local transaction identified by the vertical link-id G. Then the transaction may return to application environment L 410 local transaction A in reverse order.

In the current example in local transaction D, measurement point D1 2410 is a STARTED and INBOUND point, i.e., a measurement point where both the STARTED and INBOUND APIs are invoked in that order. Measurement point D2 2415 is an OUTBOUND point. Measurement point D3 2420 is an INBOUND point and point D4 2425 is a FINISHED point.

In local transaction E, measurement point E1 2430 is a STARTED and INBOUND point. Measurement point E2 2435 is an OUTBOUND point. Measurement point E3 2440 is an INBOUND point and point E2445 is a FINISHED point.

In local transaction F, measurement point F1 2450 is a STARTED and INBOUND point. Measurement point F2 2455 is an OUTBOUND point. Measurement point F3 2460 is a FINISHED point.

In local transaction G, measurement point G1 is a STARTED point. Measurement point G2 is a HERE point. Measurement point G3 is a FINISHED point.

A horizontal link-id specified at measurement point D2 2415 (OUTBOUND) is the same as the horizontal link-id at measurement point E1 2430 (INBOUND), coupling local transaction D and local transaction E at these points. A horizontal link-id may be used to couple OUTBOUND and INBOUND points of two separate local transactions. Horizontal link-ids may be used to couple any points of two separate local transactions using common unique identifiers that may be matched. It is the same for measurement point E4 2445 (OUTBOUND) and measurement point D3 2420 (INBOUND) on the response side with a different horizontal link-id.

Measurement point E2 2435 and measurement point F1 2450 are coupled by matched horizontal link-ids. Measurement point F3 2460 and measurement point E3 2440 are coupled by matched horizontal link-ids.

Local transactions F and G follow a different pattern, i.e., measurement point F2 2455 (OUTBOUND) is coupled to measurement point G2 2470 (HERE). This happens because although it is known that the two local transactions are somehow coupled, there may not be a way to determine an exact point where the transaction enters local transaction G. Therefore a matching INBOUND to the measurement point F2 2455 OUTBOUND cannot be defined. In this case a horizontal stitching may be used as a coupling technique.

For horizontal stitching, the pairing of measurement point F2 2455 and an arbitrary intermediate point in G, G2 2470 is made by matching one or more NAME/VALUE pairs on both sides. NAME/VALUE pairs may specify common contextual data that are enough to fully couple local transactions F and G; yet the exact position of measurement point G2 2470 is not known.

Figure 25:
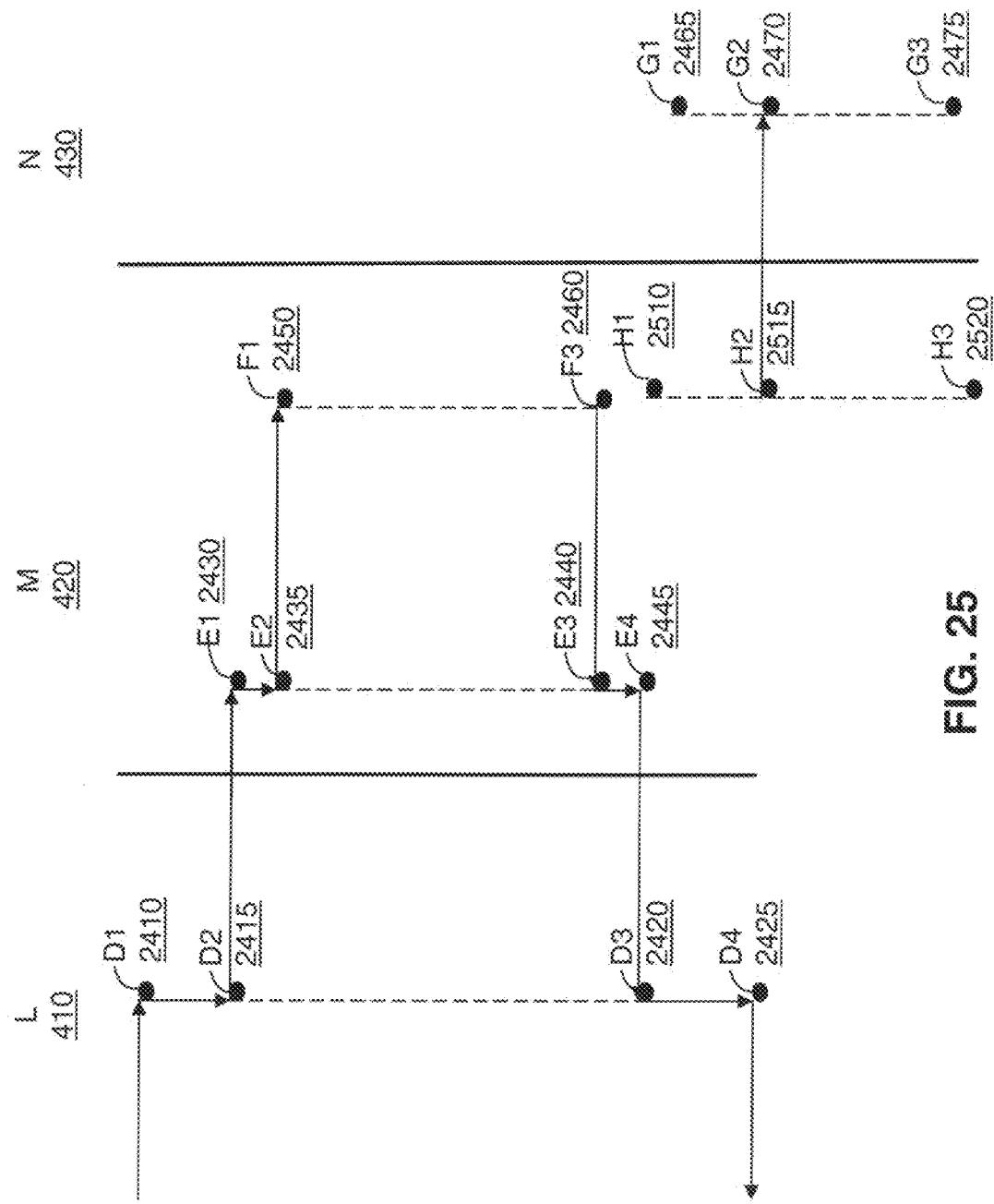
FIG. 25 shows an example alternate view of the transaction illustrated in FIG. 24.

FIG. 25 shows an alternate view of the transaction illustrated in FIG. 24. In this example, application A 320 has visibility only of local transactions D, E, and F; and application B 330 has visibility only of transactions H and G. Transaction H includes measurement point H1 2510, measurement point H2 2515, and measurement point H3 2520. Local transactions F and H are the same local transaction, but seen by two different applications that are running independently of each other.

Application A 320 may specify for measurement point F1 2450 and measurement point F3 2460 a set of vertical stitch NAME/VALUE pairs (or any other transaction attribute) which may uniquely identify the local transaction identified by F. Application B 330 may also specify for measurement point H1 2510, measurement point H2 2515, and measurement point H3 2520 the same set (or a common subset) of the NAME/VALUE pairs which may uniquely identify the local transaction as identified by H. Because the set (or subset) of NAME/VALUE pairs is identical, then local transaction F can be vertically stitched with local transaction H. Thus, two local transactions may be recognized as identical and therefore vertically stitched.

Figure 26:
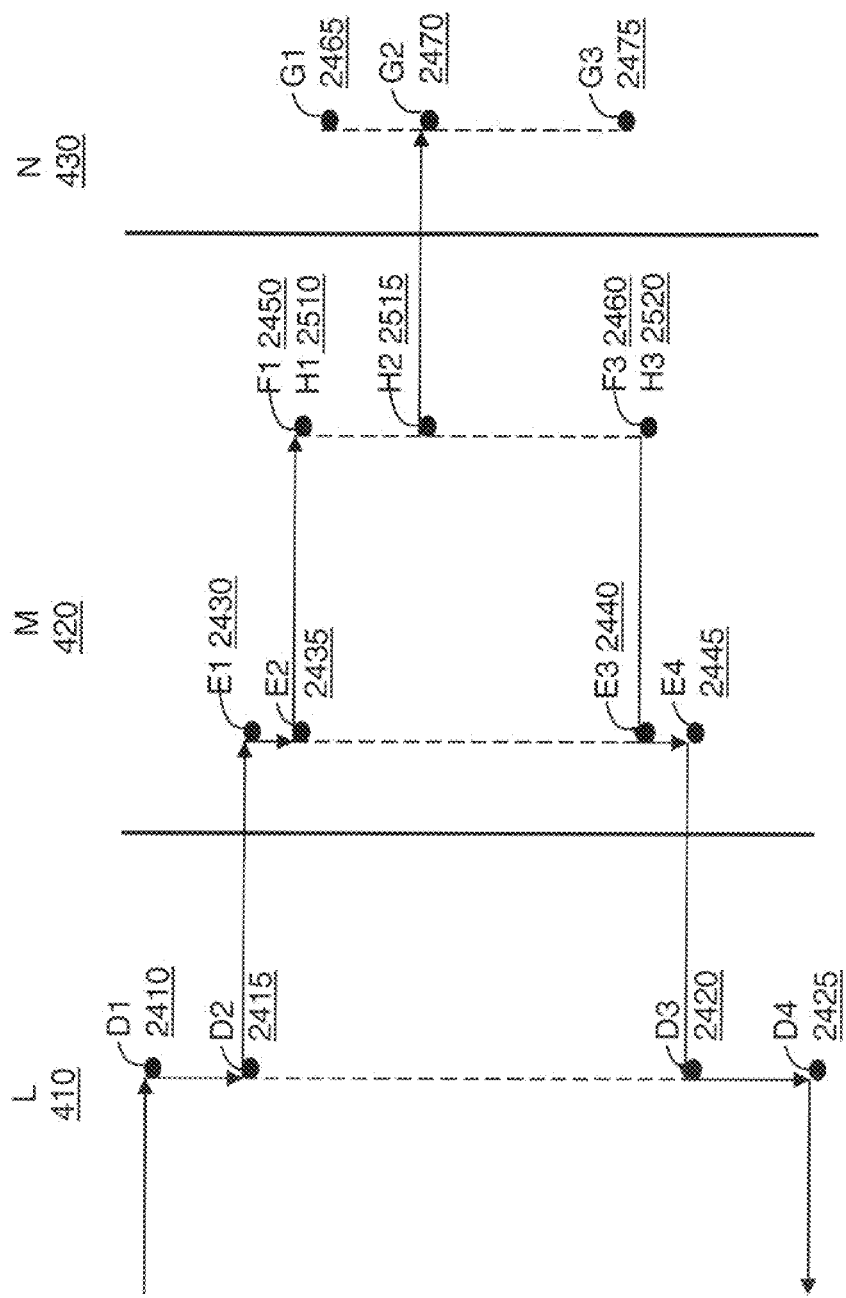
FIG. 26 depicts an example of FIG. 25 after a vertical stitch has been performed.

FIG. 26 depicts an example of FIG. 25 after the vertical stitch has been performed. As can be seen, local transactions F and H were recognized to be the same local transaction, and they were vertically stitched. The combined view in FIG. 26 looks substantially similar to the drawing in FIG. 24, and the entire transaction is shown.

Thus, applications with different monitoring techniques may operate independently and yet communicate with each other at intersection points. Unified end-to-end transaction monitoring across heterogeneous environments may be possible. The monitoring of transactions may combine dynamic correlation and token-based tracking into a single offering to provide end-to-end coverage. The dynamic correlation, on it's own or along with token-based tracking, may support existing ARM instrumentation, GPS, synchronous transactions, asynchronous transactions, monitoring transactions across a variety of platforms and through a variety of domains. Additionally, response time and transaction monitoring may be integrated. Also, natural information may be used to correlate the flow of transactions between applications without the need to flow a token.

Embodiments described herein may be used to accommodate and extend Application Response Measurement (ARM). For example, the API may be an ARM API. However, the API may also not be an ARM API. Similarly, embodiments may be used to extend and accommodate Global Publishing Server (GPS).

The Figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that the Figures are for illustrative purposes only, and in some implementations, the features or functions noted may occur differently than noted in the Figures, for example, by being in a different order, including additional or modified features or functions, or by missing certain features or functions altogether. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles. Also, the use of first, second, third, etc may be used to refer to distinct elements, but also may be used in some embodiments to refer to the same element.

What is claimed is:

1. A method comprising:
coupling a first application via a first API invocation to a data normalization layer;
coupling a second application via a second API invocation to the data normalization layer;
receiving, at a computer, a first subset of information about a transaction from the first application, the first subset of information being received via the first API invocation and the data normalization layer, wherein the first application has a first monitoring technique;
receiving, at said computer, a second subset of information about the transaction from the second application, the second subset of information being received via the second API invocation and the data normalization layer, wherein the second application has a second monitoring technique, and wherein the first monitoring technique is a different technique than the second monitoring technique;
combining, by said computer, the first subset of information with the second subset of information to produce composite information about the transaction;
receiving a third subset of information about the transaction from a third application; and
combining the third subset of information with the composite information resulting in further composite information, wherein the combining the third subset of information with the composite information includes stitching the first subset of information with the second subset of information;
wherein the first application does not have a view of the second subset of information, and the second application does not have a view of the first subset of information.

2. The method of claim 1, further comprising:
displaying the composite information and the further composite information;
wherein the data normalization layer is an application programming interface (API) driven data normalization layer.

3. The method of claim 1, wherein the stitching includes horizontal stitching.

4. The method of claim 1, wherein the stitching includes using an external file to identify stitching information, and further comprising:
using the stitching information to associate the first subset of information with the second subset of information.

5. The method of claim 1, wherein the composite information and the further composite information about the transaction includes an end-to-end view of the transaction.

6. The method of claim 1, wherein the stitching includes vertical stitching.

7. The method of claim 1, wherein the first subset of information is derived using a first specific monitoring technique, and wherein the second subset of information is derived using a second specific monitoring technique, and wherein the combining the first subset of information with the second subset of information is done using a generic monitoring technique.

8. The method of claim 1, wherein the first subset of information, the second subset of information and the third subset of information comprise overlapping transaction attributes of said transaction; and
wherein the stitching of the first subset of information with the second subset of information is a vertical stitching.

9. The method of claim 1, wherein the stitching is based on correlating one or more natural transaction attributes of the first subset of information, the second subset of information and the third subset of information.

10. A computer program product stored in a non-transitory computer readable medium, comprising functional descriptive material that, when executed by an information handling system, causes the information handling system to perform actions comprising:
communicating with a first application via a first API invocation and a data normalization layer;
communicating with a second application via a second API invocation and the data normalization layer;
receiving a first subset of information about a transaction from the first application, the first subset of information being received via the first API invocation and the data normalization layer, wherein the first application has a first monitoring technique;
receiving a second subset of information about the transaction from the second application, the second subset of information being received via the second API invocation and the data normalization layer, wherein the second application has a second monitoring technique, and wherein the first monitoring technique is a different technique than the second monitoring technique;
combining the first subset of information with the second subset of information to produce composite information about the transaction;
receiving a third subset of information about the transaction from a third application; and
combining the third subset of information with the composite information resulting in further composite information, wherein the combining the third subset of information with the composite information includes stitching the first subset of information with the second subset of information;
wherein the first application does not have a view of the second subset of information, and the second application does not have a view of the first subset of information.

11. The computer program product of claim 10 wherein the actions further comprise:
displaying the composite information and the further composite information;
wherein the data normalization layer is an application programming interface (API) driven data normalization layer.

12. The computer program product of claim 10, wherein the stitching includes horizontal stitching.

13. The computer program product of claim 10, wherein the stitching includes using an external file to identify stitching information, and further comprising:
using the stitching information to associate the first subset of information with the second subset of information.

14. The computer program product of claim 10, wherein the first subset of information, the second subset of information and the third subset of information comprise overlapping transaction attributes of said transaction; and
wherein the stitching of the first subset of information with the second subset of information is a vertical stitching.

15. The computer program product of claim 10, wherein the stitching is based on correlating one or more natural transaction attributes of the first subset of information, the second subset of information and the third subset of information.

16. An information handling system comprising:
one or more processors;
a memory accessible by at least one of the processors;
a nonvolatile storage medium accessible by at least one of the processors;
a set of instructions stored in the memory and executed by at least one of the processors in order to perform actions of:
receiving a first subset of information about a transaction from a first application, the first subset of information being received via a first API invocation and a data normalization layer, wherein the first application has a first monitoring technique;
receiving a second subset of information about the transaction from a second application, the second subset of information being received via a second API invocation and the data normalization layer, wherein the second application has a second monitoring technique, and wherein the first monitoring technique is a different technique than the second monitoring technique;
combining the first subset of information with the second subset of information to produce composite information about the transaction;
receiving a third subset of information about the transaction from a third application; and
combining the third subset of information with the composite information resulting in further composite information, wherein the combining the third subset of information with the composite information includes stitching the first subset of information with the second subset of information;
wherein the first application does not have a view of the second subset of information, and the second application does not have a view of the first subset of information.

17. The information handling system of claim 16, wherein the actions further comprise:
displaying the composite information and the further composite information;
wherein the data normalization layer is an application programming interface (API) driven data normalization layer.

18. The information handling system of claim 16, wherein the first subset of information, the second subset of information and the third subset of information comprise overlapping transaction attributes of said transaction; and
wherein the stitching of the first subset of information with the second subset of information is a vertical stitching.

19. The information handling system of claim 16, wherein the stitching is based on correlating one or more natural transaction attributes of the first subset of information, the second subset of information and the third subset of information.

* * * * *